United States Patent
Adinarayan et al.

(10) Patent No.: US 11,227,018 B2
(45) Date of Patent: Jan. 18, 2022

(54) AUTO GENERATING REASONING QUERY ON A KNOWLEDGE GRAPH

(71) Applicant: International Business Machines Corporation, Armonk, NY (US)

(72) Inventors: Geetha Adinarayan, Bangalore (IN); Hari Hara Prasad Viswanathan, Thanjavur (IN); Sathiskumar Palaniappan, Thiruchengodu (IN); Amit Mohan Mangalvedkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 16/454,774

(22) Filed: Jun. 27, 2019

(65) Prior Publication Data

US 2020/0410008 A1    Dec. 31, 2020

(51) Int. Cl.
  *G06F 16/901* (2019.01)
  *G06F 16/9032* (2019.01)
  *G06F 16/904* (2019.01)

(52) U.S. Cl.
  CPC ...... *G06F 16/90328* (2019.01); *G06F 16/904* (2019.01); *G06F 16/9024* (2019.01)

(58) Field of Classification Search
  CPC .......................... G06F 16/9024; G06F 16/367
  See application file for complete search history.

(56) References Cited

U.S. PATENT DOCUMENTS 6,571,249 B1 * 5/2003 Garrecht ............... G06F 16/338
7,853,618 B2 * 12/2010 Yuan .................... G06F 16/3344
                                                             707/794

(Continued)

FOREIGN PATENT DOCUMENTS

WO    2018072563 A1    4/2018
WO    2018226404 A1    12/2018

OTHER PUBLICATIONS

"Graph Visualization Tools", neo4j, © 2019 Neo4j, Inc., 16 pps. ,<https://neo4j.com/developer/guide-data-visualization/>.

(Continued)

*Primary Examiner* — Ryan F Pitaro
(74) *Attorney, Agent, or Firm* — David K. Mattheis; Maeve M Carpenter

(57) ABSTRACT

Aspects of the present invention disclose a method for generating a reasoning query based on a user selection of a generated data visualization of a knowledge graph. The method includes one or more processors generating a knowledge graph of a domain. The method further includes constructing a hierarchy of the knowledge graph. The method further includes generating a data visualization of the domain based at least in part on the hierarchy of the knowledge graph. The method further includes identifying a user selection of one or more nodes of the data visualization. The method further includes generating a reasoning query corresponding to the domain based on the data visualization of the domain and the user selection. The method further includes determining whether the knowledge graph includes a collection of nodes that are on a level of the constructed hierarchy that corresponds to a level of the one or more nodes.

20 Claims, 3 Drawing Sheets

(56) References Cited

U.S. PATENT DOCUMENTS

| | | | | |
|---|---|---|---|---|
| 7,865,515 | B2* | 1/2011 | Birka | G06F 16/24537 707/759 |
| 7,958,074 | B2 | 6/2011 | Uceda-Sosa | |
| 8,510,321 | B2* | 8/2013 | Ranganathan | G06F 16/284 707/765 |
| 8,984,002 | B2* | 3/2015 | Moon | G06F 16/832 707/769 |
| 10,140,384 | B2* | 11/2018 | Sathish | G06F 16/35 |
| 10,460,328 | B2* | 10/2019 | Kapoor | G06Q 30/0282 |
| 2004/0083199 | A1* | 4/2004 | Govindugari | G06F 16/215 |
| 2004/0122786 | A1 | 6/2004 | Uceda-Sosa | |
| 2005/0154708 | A1* | 7/2005 | Sun | G06F 16/27 |
| 2007/0233627 | A1* | 10/2007 | Dolby | G06N 5/022 706/45 |
| 2009/0077531 | A1* | 3/2009 | Miloslavsky | G06F 8/10 717/100 |
| 2011/0078187 | A1* | 3/2011 | Lim | G06F 16/285 707/772 |
| 2011/0320187 | A1* | 12/2011 | Motik | G06F 40/295 704/9 |
| 2013/0124574 | A1* | 5/2013 | Brettin | G06F 16/9024 707/798 |
| 2013/0159307 | A1* | 6/2013 | Wolge | G06F 16/26 707/737 |
| 2014/0115001 | A1* | 4/2014 | Arroyo | G06F 16/9032 707/772 |
| 2015/0019589 | A1* | 1/2015 | Arroyo | G06F 16/245 707/779 |
| 2016/0352825 | A1* | 12/2016 | Burba | G06F 16/1834 |
| 2017/0032025 | A1* | 2/2017 | Kumar | G06F 16/832 |
| 2017/0193088 | A1* | 7/2017 | Boguraev | G06F 40/284 |
| 2017/0329867 | A1* | 11/2017 | Lindsley | G06N 20/00 |
| 2018/0074530 | A1 | 3/2018 | Garr | |
| 2018/0239751 | A1* | 8/2018 | Durr | G06F 16/9024 |
| 2018/0336221 | A1* | 11/2018 | Pena Munoz | G06F 7/535 |
| 2019/0121801 | A1* | 4/2019 | Jethwa | G06F 16/3334 |
| 2020/0057946 | A1* | 2/2020 | Singaraju | G06N 5/022 |
| 2020/0134058 | A1* | 4/2020 | Liu | G06F 16/2379 |
| 2020/0134265 | A1* | 4/2020 | Zhang | G06F 16/367 |
| 2020/0159723 | A1* | 5/2020 | Goyal | G05B 19/0426 |
| 2020/0257988 | A1* | 8/2020 | Creel | G06F 16/9024 |
| 2020/0311111 | A1* | 10/2020 | Ferreira Moreno | G06F 40/30 |
| 2021/0103606 | A1* | 4/2021 | Malhotra | G06F 16/3329 |

OTHER PUBLICATIONS

"IBM Tririga Building Insights, formerly known as IBM IoT Building Insights, delivers foundational IoT platform to help owners and operators manage connected buildings and drive optimal performance of the entire enterprise", IBM United States Software Announcement 219-147, dated Mar. 26, 2019, 9 pps. (Grace Period Disclosure).

* cited by examiner

AUTO GENERATING REASONING QUERY ON A KNOWLEDGE GRAPH

STATEMENT REGARDING PRIOR DISCLOSURES BY THE INVENTOR OR A JOINT INVENTOR

The following disclosure(s) are submitted under 35 U.S.C. 102(b)(1)(A):
 (i) IBM United States Software Announcement 219-147, International Business Machines Corporation, Mar. 26, 2019, pages 1-9; and
 (ii) The disclosed invention is planned to be made publicly available as a part of product (TRIRIGA Building Insights V1.2) being released on 16 Feb. 2019.

BACKGROUND

The present invention relates generally to the field of semantic analysis, and more particularly to generating a reasoning query of a knowledge graph.

In recent years, developments and the growth of Internet of Things (IoT) capable devices have created competition to introduce new interfaces. The IoT is a network of physical devices embedded with electronics, software, sensors, and connectivity which enables these devices to connect and exchange data with computer-based systems. Technology is embedded in IoT-enabled devices that allow these devices to communicate, interact, be monitored, and controlled over the Internet.

Knowledge graphs represents a collection of interlinked descriptions of entities (e.g., real-world objects, events, situations, abstract concepts, etc.), which is sometimes used as a synonym for ontology. Ontology encompasses a representation, formal naming and definition of the categories, properties and relations between the concepts, data, and entities that substantiate one or more domains of discourse.

SUMMARY

Aspects of the present invention disclose a method, computer program product, and system for generating an abstract view of a knowledge graph of a domain and a reasoning query based on a user selection of the abstract view of the knowledge graph. The method includes one or more processors generating a knowledge graph of a domain. The method further includes one or more processors constructing a hierarchy of the knowledge graph. The method further includes one or more processors generating a data visualization of the domain based at least in part on the hierarchy of the knowledge graph. The method further includes one or more processors identifying a user selection of one or more nodes of the data visualization. The method further includes one or more processors generating a reasoning query corresponding to the domain based at least in part on the data visualization of the domain and the user selection. The method further includes one or more processors determining whether the knowledge graph includes a collection of nodes that are on a level of the constructed hierarchy that corresponds to a level of the user-selected one or more nodes.

DETAILED DESCRIPTION

Embodiments of the present invention allow for generating knowledge graph reasoning queries based on user selected sources of data of entities of a domain. Embodiments of the present invention generate an abstract view of a domain specific knowledge graph corresponding to entities of a domain. Additional embodiments of the present invention apply generated reasoning queries to entities of a domain at equivalent hierarchical levels of an abstract view in a domain.

Some embodiments of the present invention recognize that an understanding of reasoning queries and syntaxes are necessary to utilize a knowledge graph. Consequently, the complexity of reasoning queries and syntaxes necessitates a user-friendly and automated alternative to query data of a knowledge graph. For example, a user must learn to utilize reasoning querying and understand a syntax of a knowledge graph in order to retrieve and aggregate data of and entity of the knowledge graph. Various embodiments of the present invention resolve this need by utilizing a user selection of entities of a visualization of a domain specific knowledge graph, semantics of the corresponding nodes of a knowledge graph, and syntax of a model utilized to generate the knowledge graph to automatically generate a reasoning query that corresponds to the user selection.

Embodiments of the present invention provide the ability to create user interface components utilizing user selections of a generated abstract view. Thus, eliminating the need for user interface extensions to extend functionality of a user interface without coding or knowledge of the backend technology. Embodiments of the present invention reduce network and processing resource utilization through the ability to apply generated reasoning queries to entities of corresponding hierarchical levels of an abstract view of the knowledge graph. Thus, eliminating utilizing network and processing resource to return data in response to repetitive queries.

Implementation of embodiments of the invention may take a variety of forms, and exemplary implementation details are discussed subsequently with reference to the Figures.

Figure 1:
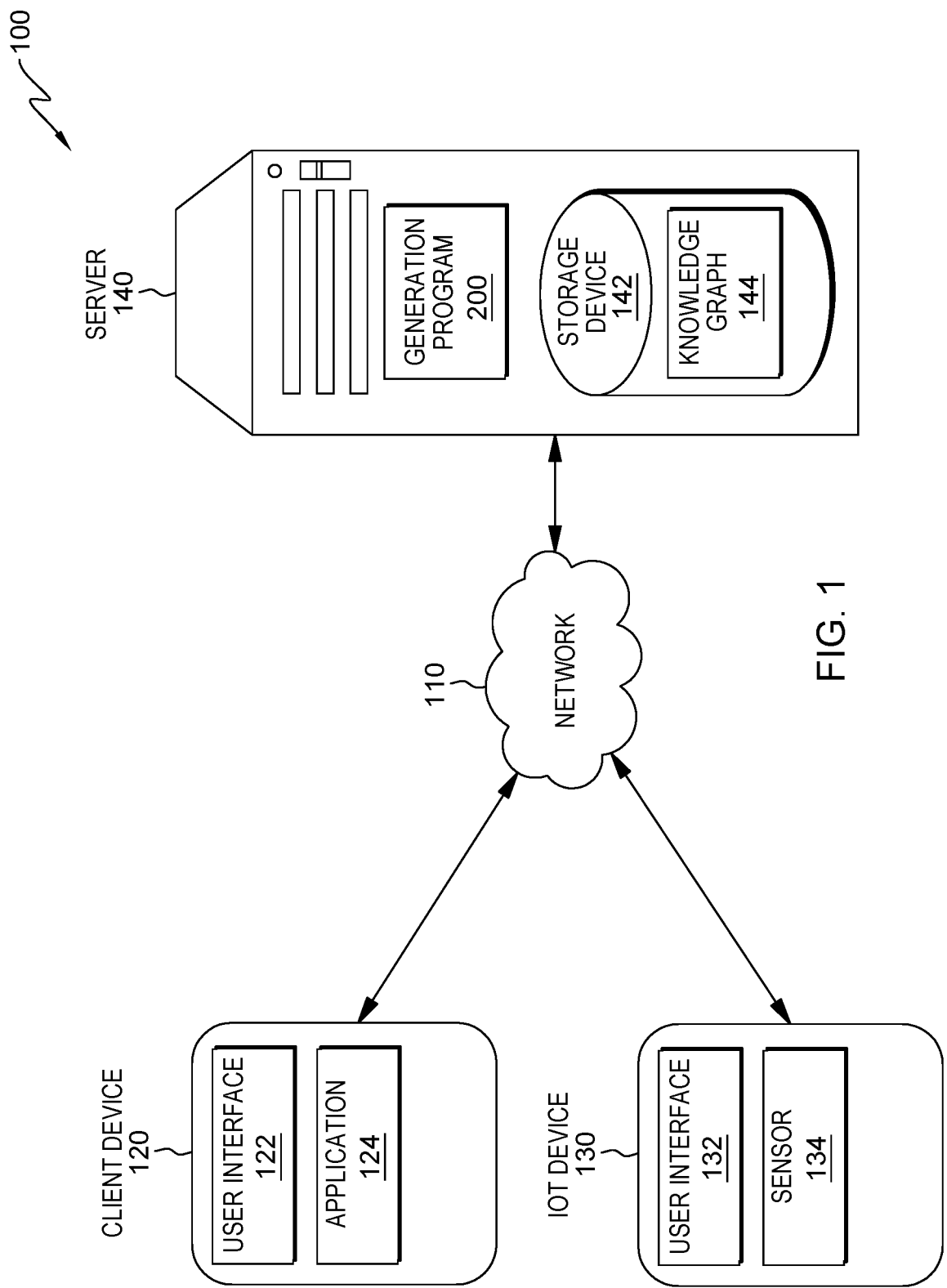
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Various embodiments of the present invention can utilize accessible sources of personal data, which may include personal devices (e.g., client device 120, Internet of Things (IoT) device 130, etc.), social media content, and/or publicly available information. For example, embodiments of the present invention can optionally include a privacy component that enables the user to opt-in or opt-out of exposing personal information. The privacy component can enable the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

An embodiment of data processing environment 100 includes client device 120, IoT device 130, and server 140, all interconnected over network 110. In one embodiment, client device 120, IoT device 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, IoT device 130, and server 140, in accordance with embodiments of the present invention. In an example, a client device 120 sends a query to server 140 for data of a sensor of IoT device 130. In this example, IoT device 130 transmits sensor data through network 110 to server 140, which retrieves the data and returns a response to the request over the Internet (e.g., via network 110).

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes user interface 122 and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to transmit a request. For example, application 124 is a software program to monitor power usage of a building. In this example, a user uses the software program to submit queries for power usage data of the building. In another embodiment, a user utilizes application 124 of client device 120 to perform tasks. For example, application 124 is a software program that interfaces with a smart building. In this example, a user uses the software program to create a building semantic model of the smart building, view data of the smart building, add historical building data, manage user, manage building energy usage, and/or manage building occupancy.

In various embodiments of the present invention, IoT device 130 may be a smart building, automobile, or any other device capable of executing computer readable program instructions, in accordance with embodiments of the present invention. IoT device 130 includes interface 132, and sensor 134. In various embodiments of the present invention, a user utilizes IoT device 130 to retrieve data of received request, perform task, and/or communicate with other IoT-enabled devices.

IoT device 130 includes interface 132, and sensor 134. Interface 132 provides an interface between a sensor of IoT device 130 and a plurality of applications that reside on a computer or other suitable device. A variety of types of sensor interfaces exist. In one embodiment, interface 132 is a physical layer (e.g., a sensor interface chip). Sensor interface chips are integrated circuits (IC) that may enable a system to read out information from the input signal generated by complex sensors, providing a suitable output signal for a system to store, display, and/or process. In another embodiment, IoT device 130 may utilize a protocol to transfer data of interface 132 between computers or users and smart sensors. For example, interface 132 is a simple sensor interface (SSI) protocol.

Sensor 134 is a device, module, or subsystem that detects or measures a physical property of an environment and records, indicates, or otherwise responds to the physical property, which is transmitted to other electronic devices. For example, sensor 134 is one or more sensors of an environment to record conditions within in the environment. In this example, sensor 134 may include smart sensors and/or meters.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100. In general, server 140 is representative of any electronic device or combination of electronic devices capable of executing computer readable program instructions. For example, server 140 can be computing resources available via cloud computing services. Server 140 may include components as depicted and described in further detail with respect to FIG. 3, in accordance with embodiments of the present invention.

Server 140 includes storage device 142, knowledge graph 144, and generation program 200. Storage device 142 can be implemented with any type of storage device, for example, persistent storage 305, which is capable of storing data that may be accessed and utilized by server 140, client device 120, and IoT device 130, such as a database server, a hard disk drive, or a flash memory. In one embodiment storage device 142 can represent multiple storage devices within server 140. In various embodiments of the present invention storage device 142 stores a plurality of information, such as data of sensor 134 and knowledge graph 144. In another embodiment, data processing environment 100 can include additional servers (not shown) that host additional information that accessible via network 110.

Generally, a knowledge graph acquires and integrates information into an ontology. Knowledge graph 144 is a network of entities, entity semantic types, properties, and relationships between entities organized in a graph which covers various topical domains. In one embodiment, knowledge graph 144 is modeled to correspond to IoT device 130. For example, IoT device 130 may be a smart building, which includes sensors, meters, and assets that are IoT enabled. In this example, knowledge graph 144 includes semantic descriptions, type, and location of entities (e.g., sensors, meters, assets, etc.) of the smart building. Additionally, knowledge graph 144 includes relationships between the entities in a graph form. In another embodiment, knowledge graph 144 includes one or more domains of IoT device 130. For example, knowledge graph 144 may include a respective domain that corresponds to each floor of a smart building. In this example, knowledge graph 144 may also include one or more smart buildings of a campus and the one or more smart buildings include one or more floors represented in a knowledge graph.

In various embodiments, generation program 200 utilizes a user selection of entities of a visualization of a domain specific knowledge graph, semantics of the corresponding nodes of a knowledge graph, and syntax of a model utilized to automatically generate a reasoning query that corresponds to the user selection. In one embodiment, generation program 200 generates knowledge graph 144 utilizing data of IoT device 130. For example, generation program 200 integrates data of IoT device 130 into a semantic model schema (e.g., a standard for representing building systems, entities, relationships between entities, etc.). In this example, generation program 200 utilizes collected data of sensor 134 and the semantic model to construct knowledge graph 144 for a building (e.g., IoT device 130) in an enterprise (e.g., a plurality of instances of IoT device 130) and assets (e.g., sensor 134) of the building. Thus, generation program 200 can map semantic labels (e.g., metadata, device type, device identification, message topic, varying data values of a device, etc.) of IoT device 130 to corresponding entities of knowledge graph 144.

In another embodiment, generation program 200 generates a visualization of knowledge graph 144. For example, generation program 200 identifies a root node of knowledge graph 144. In this example, generation program 200 utilizes the device identifier (e.g., name, semantic identifier, etc.) to query all of the nodes of knowledge graph 144 to identify relationships with the root node. Additionally, generation program 200 utilizes metadata (e.g., entity type) of nodes with identified relationships with the root node and generates a hierarchy (e.g., a tree map) of nodes based on unique types identified in the metadata of the node (e.g., entity). Furthermore, generation program 200 constructs a hierarchy for each node of knowledge graph 144.

In another embodiment, generation program 200 generates a reasoning query utilizing a user interaction with client device 120. For example, a user selects nodes of an abstracted view of knowledge graph 144 via user interface 122 of client device 120 and generation program 200 extracts the name (e.g., semantic identifier) of the selected nodes. Additionally, generation program 200 retrieves relations of the selected nodes from knowledge graph 144. In this example, generation program 200 constructs a reasoning query corresponding to the user selection utilizing the syntax of the schema model, the extracted names of the nodes, and the retrieved relations.

Figure 2:
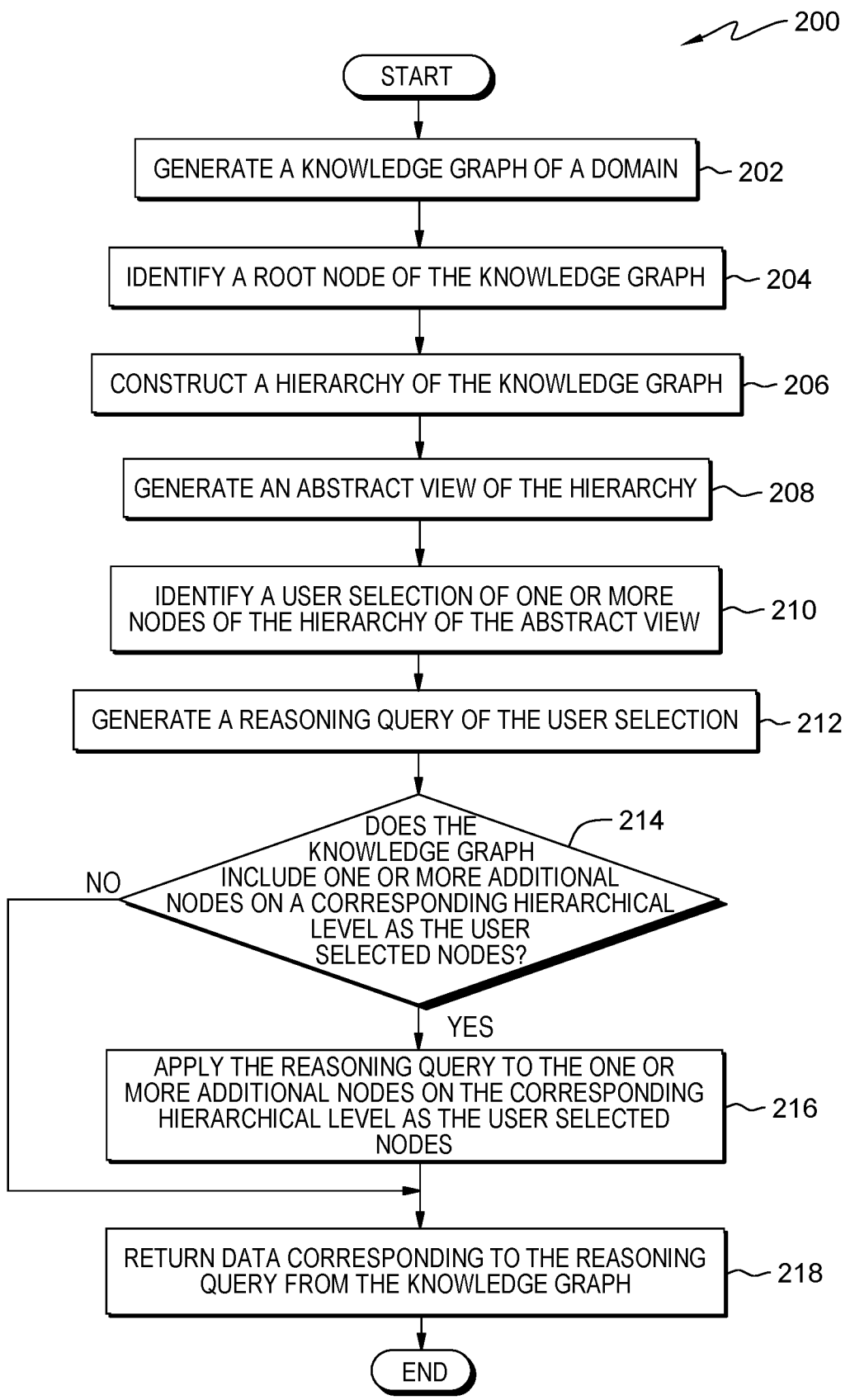
FIG. 2 is a flowchart depicting operational steps of a program, on a proxy server computer within the data processing environment of FIG. 1, for generating knowledge graph reasoning queries, in accordance with an embodiment of the present invention.

FIG. 2 is a flowchart depicting operational steps of generation program 200, a program for generating an abstract view of a knowledge graph of a domain and a reasoning query based on a user selection of the abstract view of the knowledge graph, in accordance with embodiments of the present invention. In one embodiment, generation program 200 initiates in response to a user registering IoT device 130 with generation program 200. For example, generation program 200 initiates in response to a user linking the smart building to an online account. In another embodiment, generation program 200 initiates in response to integrating data of IoT device 130 with knowledge graph 144. For example, generation program 200 initiates in response to a user creating a model of a smart building.

In step 202, generation program 200 generates a knowledge graph of a domain. In one embodiment, generation program 200 retrieves data of sensor 136 of IoT device 130 utilizing interface 132. For example, generation program 200 retrieves onsite meter and sensor data (e.g., sensor 136) via a connect-and-collect layer (e.g., interface 132) of a smart building (e.g., utilizing data from IoT device 130). In this example, the smart building may be a domain that includes one or more additional domains (e.g., floors, rooms, etc.) In another embodiment, generation program 200 integrates data of IoT device 130 into a semantic model. For example, a semantic model is a uniform schema for representing metadata in buildings. Additionally, the sematic model includes: a resource development framework (RDF) class hierarchy detailing various building subsystems, entities, and assets; a minimal principled set of relationships for connecting entities together into a directed graph representing a one or more buildings and/or domains. In this example, generation program 200 uses semantic labels (e.g., descriptive metadata) of sensors and meters of a smart building and the semantic model to generate the directed graph (e.g., knowledge graph 144) corresponding to one or more buildings and/or domains (e.g., IoT device 130).

In step 204, generation program 200 identifies a root node of the knowledge graph. In one embodiment, generation program 200 identifies a root node of knowledge graph 144. For example, a root node may be a structure which contains a value, condition, or represents a separate data structure that may be the topmost node in a tree (i.e., does not have a parent node). In this example, generation program 200 may use semantic labels of a domain (e.g., smart building, floor of a building, entities of the building, etc.) from the semantic model to identify a root node in a directed graph (e.g., knowledge graph 144). In another example, generation program 200 may utilize graph traversal methods (e.g., depth-first search, breadth-first search, etc.) to identify a root node of a directed graph.

In step 206, generation program 200 constructs a hierarchy of the knowledge graph. In one embodiment, generation program 200 utilizes administrative metadata and relationships of knowledge graph 144 to construct a hierarchy of knowledge graph 144. For example, a hierarchy is the arrangement of a particular set of one or more nodes into ranks or levels. In another example, generation program 200 uses a semantic label (e.g., value, condition, etc.) of a root node to query each node of a directed graph (e.g., knowledge graph 144) to determine whether a relationship exist between the root node and each node of the directed graph. Additionally, generation program 200 uses administrative metadata (e.g., device type, device id, message topic, variable data type, etc.) to identify a type for each node with a determined relationship with the root node. In this example, generation program 200 creates hierarchy based on the determined relationship and a distinctive type identified for each node. Furthermore, generation program 200 repeats the above methodology for each node of the directed graph (i.e., generating a hierarchy for the parent and child nodes of the root node).

In step 208, generation program 200 generates an abstract view of the hierarchy. In one embodiment, generation program 200 utilizes the constructed hierarchy to generate an abstract view of knowledge graph 144 corresponding to IoT device 130. For example, generation program 200 generates a visualization of a directed graph (e.g., knowledge graph 144) that corresponds to a generated hierarchy the directed graph. In this example, generation program 200 utilizes the semantic labels that represent building meters, sensors, entities, and/or assets and relationships of the generated hierarchy to create a tree structure diagram of a smart building (e.g., IoT device 130). Additionally, generation program 200 allows for all objects (e.g., meters, sensors, floors, building location within floors, occupancy data, assets, etc.) defined in the semantic model to be viewable in the tree structure. In another example, generation program 200 constructs a visualization of a specific domain. In this example, the specific domain may be a floor of a building or one building of a campus of buildings.

In step 210, generation program 200 identifies a user selection of one or more nodes of the hierarchy abstract view. In one embodiment, generation program 200 monitors user interface 122 to detect a user interaction with an abstract view displayed via application 124. For example, generation program 200 monitors a GUI (e.g., user interface 122) of a computing device and detects that a user selection of three (3) objects of a generated tree diagram that corresponds to nodes (e.g., entities) a generated directed graph.

In step 212, generation program 200 generates a reasoning query of the user selection. In one embodiment, generation program 200 generates a reasoning query that corresponds to a user interaction with an object of a generated abstract view of knowledge graph 144. For example, generation program 200 extracts semantic labels of objects (e.g., nodes) a user selects from a tree diagram (e.g., generated abstract view) of a directed graph (e.g., knowledge graph 144). Additionally, generation program 200 extracts relationships between the selected nodes of the tree diagram from the directed graph. In this example, generation program 200 produces a reasoning query corresponding to the user selections of the tree diagram using the relationships between the selected nodes from the directed graph, syntax of the semantic model used to construct the directed graph, and semantic labels as inputs.

In decision step 214, generation program 200 determines whether the knowledge graph includes one or more additional nodes that are on a hierarchical level that corresponds to the user-selected nodes. In various embodiments of the present invention, generation program 200 determines whether one or more additional nodes are members of an equivalent level of a constructed hierarchy as a member (e.g., parent node) of the user-selected nodes (from step 210). In one embodiment, generation program 200 traverses a constructed hierarchy corresponding to knowledge graph 144 to determine whether one or more objects exist in a collection (i.e., all of the objects at one level of a hierarchy) that includes an object of a user selection. For example, generation program 200 performs a breadth-first search (BFS) starting with a root node of a tree diagram of a constructed hierarchy. In this example, generation program 200 utilizes the BFS to explore a level that includes the parent node of the user selection and determines whether other nodes are present at the level that includes the parent node.

In another embodiment, generation program 200 utilizes structural metadata of a constructed hierarchy corresponding to knowledge graph 144 to determine whether one or more objects are peers (i.e., objects with the equivalent rank and therefore at the same level in a hierarchy) of an object of a user selection. For example, generation program 200 utilizes data that describes the arrangement of nodes in a constructed hierarchy (i.e., structural metadata) to determine whether nodes of a user selection are within an equivalent rank as one or more nodes of the constructed hierarchy that corresponds to a depicted graph.

If generation program 200 determines that one or more objects does not exist in a collection that includes an object of a user selection (decision step 214, "NO" branch), then generation program 200 continues to step 218 to return data corresponding to the reasoning query of the user selection from knowledge graph 144. For example, if generation program 200 determines that a knowledge graph does not include one or additional more nodes that are members of a collection that includes a parent node of a user selection, then generation program 200 returns data corresponding to the generated reasoning query of the user selection from a depicted graph. In another scenario, if generation program 200 determines that a knowledge graph does not include one or more objects that are of an object of a user selection, then generation program 200 returns data corresponding to the generated reasoning query of the user selection from a depicted graph.

In step 216, generation program 200 applies the reasoning query to the one or more additional nodes on the corresponding hierarchical level of the user-selected nodes. More specifically, in response to generation program 200 determining that the knowledge graph includes one or more nodes that are members of a collection that includes a parent node of user-selected nodes (decision step 214, "YES" branch), then generation program 200 applies the reasoning query to one or more nodes on the corresponding hierarchical level of the user-selected nodes. For example, if generation program 200 determines that one or more nodes are members of a collection that includes a parent node of a user selection, then generation program 200 may apply the reasoning query to the one or more nodes that are members of the collection that includes the parent node of a user selection.

In one embodiment, generation program 200 allows a user to apply a generated reasoning query to a portion of an abstracted view of knowledge graph 144 that corresponds to one or more additional nodes that are on an equivalent hierarchical level as the user-selected nodes (from step 210). For example, generation program 200 utilizes variables (e.g., semantic labels, relationships, etc.) of one or more nodes of a collection that includes nodes of the user selection to construct a reasoning query that corresponds to portions of a tree diagram of a depicted graph (e.g., knowledge graph 144) using the methodology of step 212. In this example, generation program 200 allows a user to use an auto-generated reasoning query to request predicted energy usage of a first building of a campus (e.g., a first entity of a domain) and apply the auto generated reasoning query to request predicted energy usage of a second building of the campus (e.g., a second entity of a domain). Additionally, the first and second buildings of the campus are peers in the tree diagram of the depicted graph.

In step 218, generation program 200 returns data corresponding to the reasoning query from the knowledge graph. In one embodiment, generation program 200 retrieves data from storage device 142 that corresponds to a user request for data of sensor 134 utilizing application 124. For example, generation program 200 returns temperature data from a sensor of a thermostat (e.g., an entity) of a building (e.g., IoT device 130) in response to a query from a user. In another embodiment, generation program 200 returns data of IoT device 130 and a custom generated abstract view. For example, generation program 200 receives a first request (e.g., reasoning query) from a selection on a tree diagram (e.g., abstracted view) for temperature data of for a first floor of a building. Additionally, generation program 200 receives a second request from a selection on the tree diagram for temperature data of for a second floor of the building. Furthermore, generation program 200 returns temperature data from sensors of thermostats (e.g., an entity) of the first and second floors of the building (e.g., IoT device 130). In this example, generation program 200 creates a data card (e.g., visualization, user interface component, etc.) that displays the temperature data of the first and second floors (e.g., one or more domains) in a window of a computer of the user. In another example, a custom generated abstract view can be a user interface element such as a table, button, dialog, graph, etc., that display results returned from a knowledge graph. In this example, generation program 200 creates user interface elements based on data returned from the knowledge graph based on a user selection.

Figure 3:
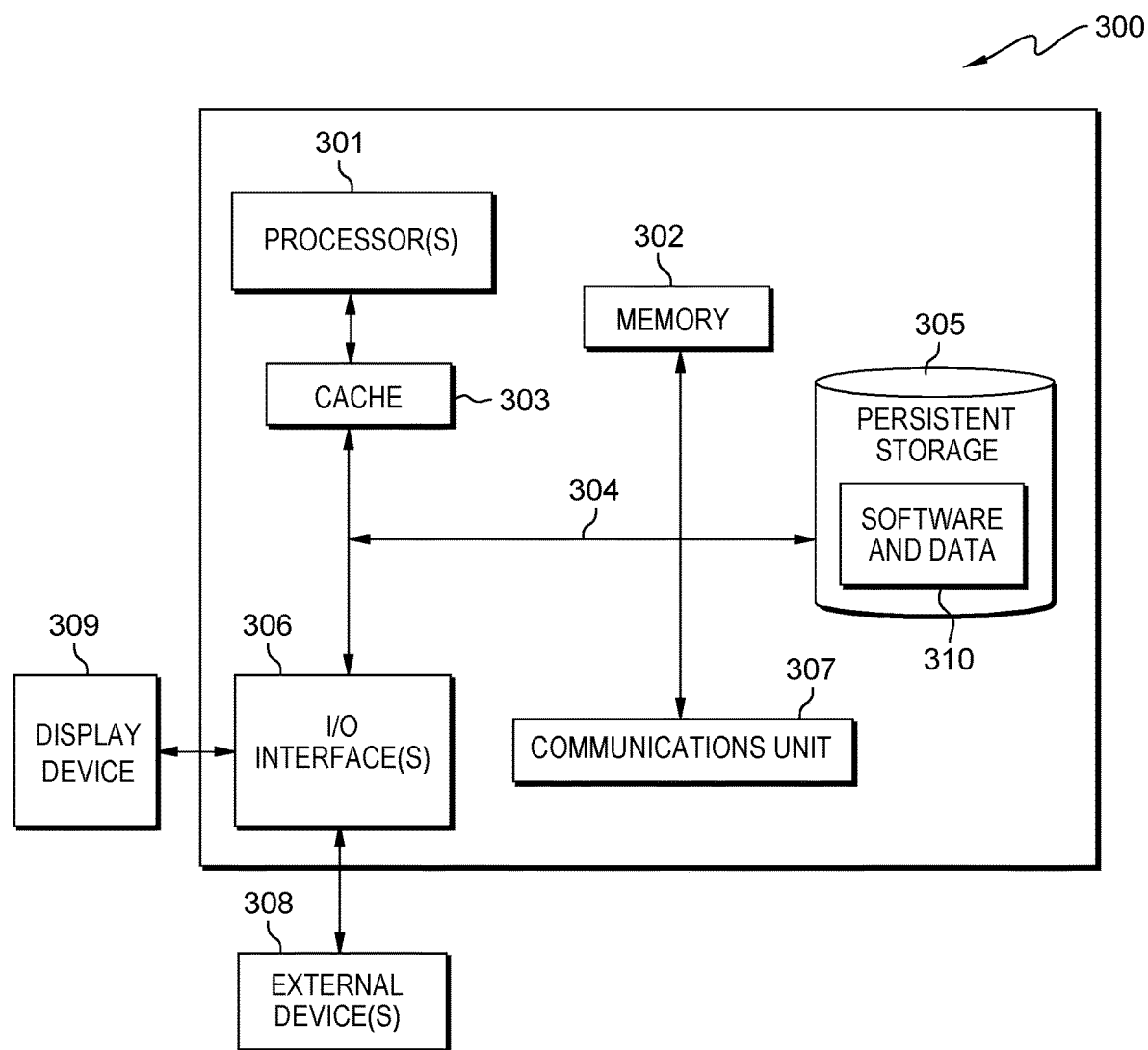
FIG. 3 is a block diagram of components of the proxy server computer representative of the client device, Internet of Things (IoT) device, and server of FIG. 1, in accordance with an embodiment of the present invention.

FIG. 3 depicts a block diagram of components of client device 120, IoT device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122 and application 124. With respect to IoT device 130, software and data 310 includes data of interface 132 and sensor 134. With respect to server 140, software and data 310 includes generation program 200 and data of storage device 142, which includes knowledge graph 144.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, a microphone, a camera, a sensor, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   generating, by one or more processors, a knowledge graph of a domain;
   constructing, by one or more processors, a hierarchy of the knowledge graph;
   generating, by one or more processors, a data visualization of the domain based at least in part on the hierarchy of the knowledge graph;
   identifying, by one or more processors, a user selection of one or more nodes of the data visualization;
   generating, by one or more processors, a first reasoning query corresponding to the domain based at least in part on the data visualization of the domain and the user selection;
   identifying, by one or more processors, one or more peer nodes of the knowledge graph that correspond to a parent node of the user selection, wherein the one or more peer nodes are parent nodes of a hierarchy level of the parent node of the user selection; and
   generating, by one or more processors, a second reasoning query for an identified parent node of the identified one or more peer nodes based at least in part on the first reasoning query and semantic labels of the identified parent node of the identified one or more peer nodes.

2. The method of claim 1, further comprising:
   in response to identifying the one or more peer nodes of the knowledge graph that correspond to the parent node of the user selection, querying, by one or more processors, a segment of the knowledge graph that corresponds to the identified parent node of the identified one or more peer nodes of the hierarchy level of the parent node of the user selection using the second reasoning query.

3. The method of claim 1, further comprising:
   retrieving, by one or more processors, data of the knowledge graph that corresponds to the first generated reasoning query;
   creating, by one or more processors, a customizable user interface component, wherein the customizable user interface component includes a data dashboard card; and
   displaying, by one or more processors, the retrieved data of the knowledge graph in the customizable user interface component.

4. The method of claim 1, wherein generating the knowledge graph of the domain, further comprises:
   retrieving, by one or more processors, data of the domain, wherein the data includes one or more semantic labels of one or more internet of things (IoT) capable devices, wherein the domain is selected from a group consisting of: a building, floor of a building, entities of a building, and assets of a building; and
   integrating, by one or more processors, the data of the domain into a semantic model, wherein the semantic model includes a resource development framework (RDF) class hierarchy and a set of relationships for connecting the one or more semantic labels.

5. The method of claim 1, wherein constructing the hierarchy of the knowledge graph, further comprises:
   identifying, by one or more processors, a root node of the knowledge graph;
   determining, by one or more processors, a relationship between the root node and one or more nodes of the knowledge graph;
   identifying, by one or more processors, a type corresponding to each of the one or more nodes of the knowledge graph with a determined relationship with the root node;
   linking, by one or more processors, the root node and each of the one or more nodes of the knowledge graph based on the determined relationship with the root node and each of the one or more nodes of the knowledge graph; and
   assigning, by one or more processors, each of the one or more nodes of the knowledge graph to a hierarchical level based on a respective distinct identified type.

6. The method of claim 5, wherein generating the data visualization of the domain based at least in part on the hierarchy of the knowledge graph, further comprises:
   retrieving, by one or more processors, the hierarchy of the knowledge graph;
   retrieving, by one or more processors, the identified types of each of the one or more nodes;
   retrieving, by one or more processors, the determined relationship with the root node for each of the one or more nodes of the knowledge graph; and
   constructing, by one or more processors, the data visualization of the knowledge graph, wherein the data visualization is a tree diagram based at least in part on the hierarchy of the knowledge graph, the identified types, and the determined relationship.

7. The method of claim 1, wherein generating the first reasoning query corresponding to the domain based at least in part on the data visualization of the domain and the user selection, further comprises:
   extracting, by one or more processors, a semantic label of the one or more nodes corresponding to the user selection;
   extracting, by one or more processors, a relationship between the user-selected one or more nodes from the hierarchy of the knowledge graph;
   extracting, by one or more processors, a syntax of a semantic model; and
   generating, by one or more processors, a reasoning query corresponding to the user selection, wherein the reasoning query includes the extracted semantic label, the extracted relationship, and the extracted syntax.

8. A computer program product comprising:
   one or more computer readable storage media and program instructions stored on the one or more computer readable storage media, the program instructions comprising:
   program instructions to generate a knowledge graph of a domain;
   program instructions to construct a hierarchy of the knowledge graph;
   program instructions to generate a data visualization of the domain based at least in part on the hierarchy of the knowledge graph;
   program instructions to identify a user selection of one or more nodes of the data visualization;
   program instructions to generate a first reasoning query corresponding to the domain based at least in part on the data visualization of the domain and the user selection;
   program instructions to identify one or more peer nodes of the knowledge graph that correspond to a parent node of the user selection, wherein the one or more peer nodes are parent nodes of a hierarchy level of the parent node of the user selection; and program instructions to generate a second reasoning query for an identified parent node of the identified one or more peer nodes based at least in part on the first reasoning query and semantic labels of the identified parent node of the identified one or more peer nodes.

9. The computer program product of claim 8, further comprising program instructions, stored on the one or more computer readable storage media, to:
in response to identifying the one or more peer nodes of the knowledge graph that correspond to the parent node of the user selection, query a segment of the knowledge graph that corresponds to the identified parent node of the identified one or more peer nodes of the hierarchy level of the parent node of the user selection using the second reasoning query.

10. The computer program product of claim 8, further comprising program instructions, stored on the one or more computer readable storage media, to:
retrieve data of the knowledge graph that corresponds to the first generated reasoning query;
create a customizable user interface component, wherein the customizable user interface component includes a data dashboard card; and
display the retrieved data of the knowledge graph in the customizable user interface component.

11. The computer program product of claim 8, wherein program instructions to generate the knowledge graph of the domain, further comprise program instructions to:
retrieve data of the domain, wherein the data includes one or more semantic labels of one or more internet of things (IoT) capable devices, wherein the domain is selected from a group consisting of: a building, floor of a building, entities of a building, and assets of a building; and
integrate the data of the domain into a semantic model, wherein the semantic model includes a resource development framework (RDF) class hierarchy and a set of relationships for connecting the one or more semantic labels.

12. The computer program product of claim 8, wherein program instructions to construct the hierarchy of the knowledge graph, further comprise program instructions to:
identify a root node of the knowledge graph;
determine a relationship between the root node and one or more nodes of the knowledge graph;
identify a type corresponding to each of the one or more nodes of the knowledge graph with a determined relationship with the root node;
link the root node and each of the one or more nodes of the knowledge graph based on the determined relationship with the root node and each of the one or more nodes of the knowledge graph; and
assign each of the one or more nodes of the knowledge graph to a hierarchical level based on a respective distinct identified type.

13. The computer program product of claim 12, wherein program instructions to generate the data visualization of the domain based at least in part on the hierarchy of the knowledge graph, further comprise program instructions to:
retrieve the hierarchy of the knowledge graph;
retrieve the identified types of each of the one or more nodes;
retrieve the determined relationship with the root node for each of the one or more nodes of the knowledge graph; and
construct the data visualization of the knowledge graph, wherein the data visualization is a tree diagram based at least in part on the hierarchy of the knowledge graph, the identified types, and the determined relationship.

14. The computer program product of claim 8, wherein program instructions to generate the first reasoning query corresponding to the domain based at least in part on the data visualization of the domain and the user selection, further comprise program instructions to:
extract a semantic label of the one or more nodes corresponding to the user selection;
extract a relationship between the user-selected one or more nodes from the hierarchy of the knowledge graph;
extract a syntax of a semantic model; and
generate a reasoning query corresponding to the user selection, wherein the reasoning query includes the extracted semantic label, the extracted relationship, and the extracted syntax.

15. A computer system comprising:
one or more computer processors;
one or more computer readable storage media; and
program instructions stored on the computer readable storage media for execution by at least one of the one or more processors, the program instructions comprising:
program instructions to generate a knowledge graph of a domain;
program instructions to construct a hierarchy of the knowledge graph;
program instructions to generate a data visualization of the domain based at least in part on the hierarchy of the knowledge graph;
program instructions to identify a user selection of one or more nodes of the data visualization;
program instructions to generate a first reasoning query corresponding to the domain based at least in part on the data visualization of the domain and the user selection;
program instructions to identify one or more peer nodes of the knowledge graph that correspond to a parent node of the user selection, wherein the one or more peer nodes are parent nodes of a hierarchy level of the parent node of the user selection; and
program instructions to generate a second reasoning query for an identified parent node of the identified one or more peer nodes based at least in part on the first reasoning query and semantic labels of the identified parent node of the identified one or more peer nodes.

16. The computer system of claim 15, further comprising program instructions, stored on the one or more computer readable storage media for execution by at least one of the one or more processors, to:
in response to identifying the one or more peer nodes of the knowledge graph that correspond to the parent node of the user selection, query a segment of the knowledge graph that corresponds to the identified parent node of the identified one or more peer nodes of the hierarchy level of the parent node of the user selection using the second reasoning query.

17. The computer system of claim 15, further comprising program instructions, stored on the one or more computer readable storage media for execution by at least one of the one or more processors, to:
retrieve data of the knowledge graph that corresponds to the first generated reasoning query;
create a customizable user interface component, wherein the customizable user interface component includes a data dashboard card; and display the retrieved data of the knowledge graph in the customizable user interface component.

18. The computer system of claim 15, wherein program instructions to generate the knowledge graph of the domain, further comprise program instructions to:
retrieve data of the domain, wherein the data includes one or more semantic labels of one or more internet of things (IoT) capable devices, wherein the domain is selected from a group consisting of: a building, floor of a building, entities of a building, and assets of a building; and
integrate the data of the domain into a semantic model, wherein the semantic model includes a resource development framework (RDF) class hierarchy and a set of relationships for connecting the one or more semantic labels.

19. The computer system of claim 15, wherein program instructions to construct the hierarchy of the knowledge graph, further comprise program instructions to:
identify a root node of the knowledge graph;
determine a relationship between the root node and one or more nodes of the knowledge graph;
identify a type corresponding to each of the one or more nodes of the knowledge graph with a determined relationship with the root node;
link the root node and each of the one or more nodes of the knowledge graph based on the determined relationship with the root node and each of the one or more nodes of the knowledge graph; and
assign each of the one or more nodes of the knowledge graph to a hierarchical level based on a respective distinct identified type.

20. The computer system of claim 19, wherein program instructions to generate the data visualization of the domain based at least in part on the hierarchy of the knowledge graph, further comprise program instructions to:
retrieve the hierarchy of the knowledge graph;
retrieve the identified types of each of the one or more nodes;
retrieve the determined relationship with the root node for each of the one or more nodes of the knowledge graph; and
construct the data visualization of the knowledge graph, wherein the data visualization is a tree diagram based at least in part on the hierarchy of the knowledge graph, the identified types, and the determined relationship.

* * * * *